United States Patent [19]

Dauenhauer

[11] 3,791,389

[45] Feb. 12, 1974

[54] MECHANICAL VINE TRANSFER AND CARRIER

[76] Inventor: Florian F. Dauenhauer, 111-121 Fifth St., Santa Rosa, Calif. 95401

[22] Filed: Oct. 16, 1972

[21] Appl. No.: 297,896

[52] U.S. Cl. ............................... 130/30 D, 171/56
[51] Int. Cl. .............................................. A01g 19/00
[58] Field of Search.. 130/30 D, 30 R, 30 J; 171/56, 171/61

[56] References Cited
UNITED STATES PATENTS

| | | |
|---|---|---|
| 1,302,118 | 4/1919 | Wulfhoop ............................ 171/56 |
| 1,445,535 | 2/1923 | Moreschini ........................... 171/61 |
| 1,544,884 | 7/1925 | Burtless ................................ 171/61 |
| 1,989,152 | 1/1935 | Rassmann ............................. 171/61 |
| 2,677,378 | 4/1954 | Dauenhauer ..................... 130/30 D |
| 2,757,785 | 8/1956 | Dauenhauer ..................... 130/30 D |

*Primary Examiner*—Antonio F. Guida

[57] ABSTRACT

Mechanically operable means for automatically transferring hanging hop vines from at rest positions at a station in an upright hop picking machine into the jaws of vine grippers on moving vine carriers which transport the hanging vines through the hop picking unit of the machine.

14 Claims, 17 Drawing Figures

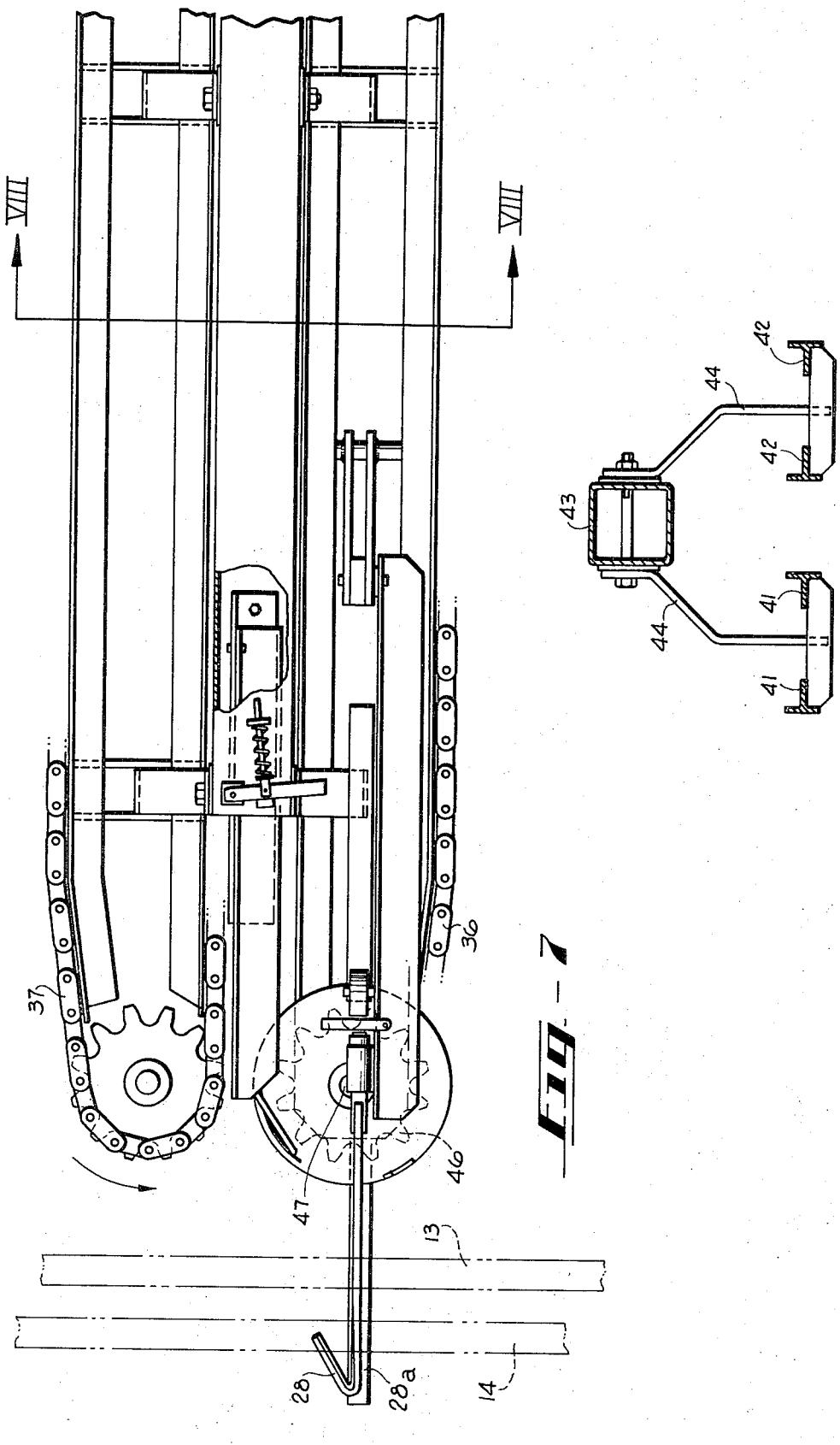

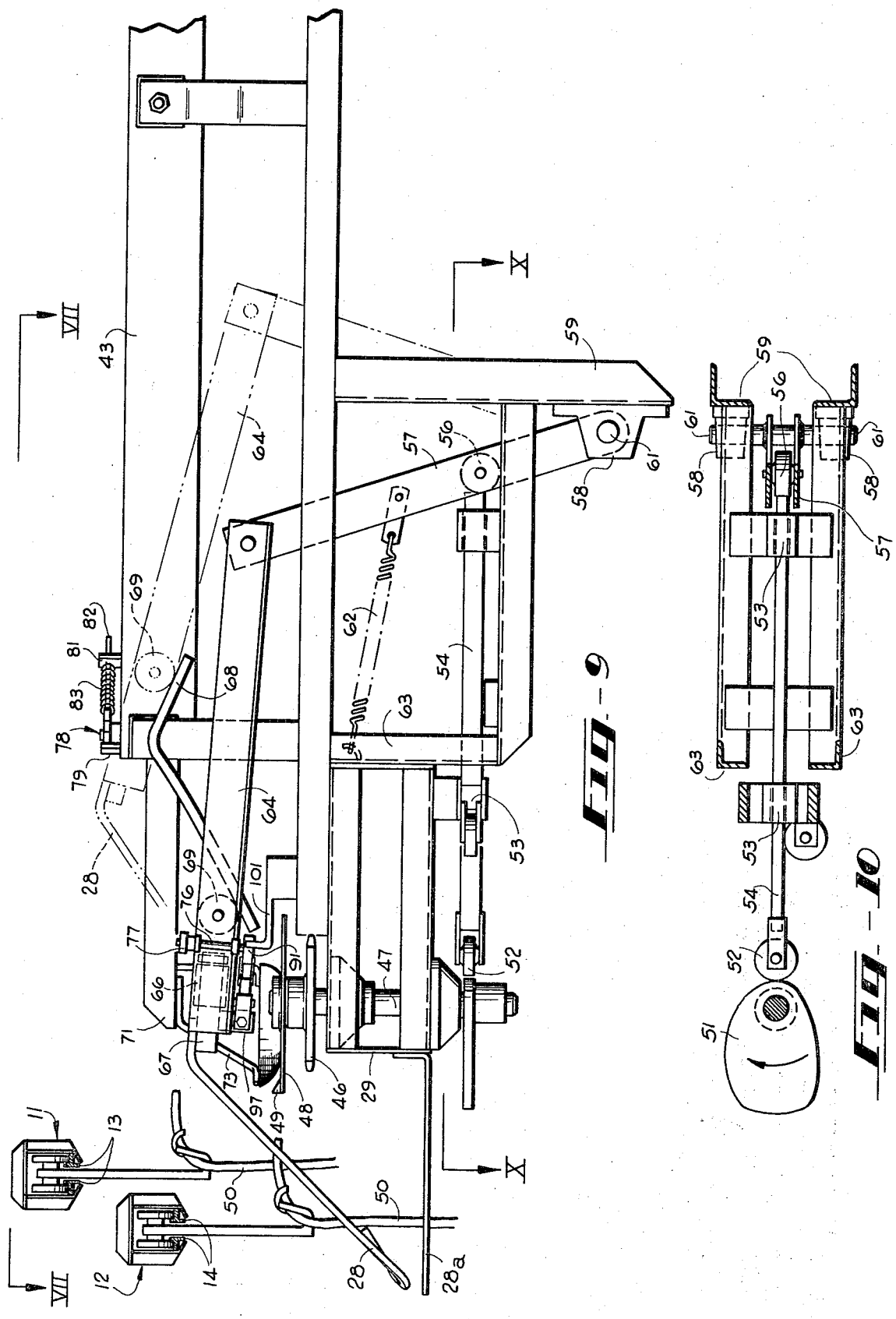

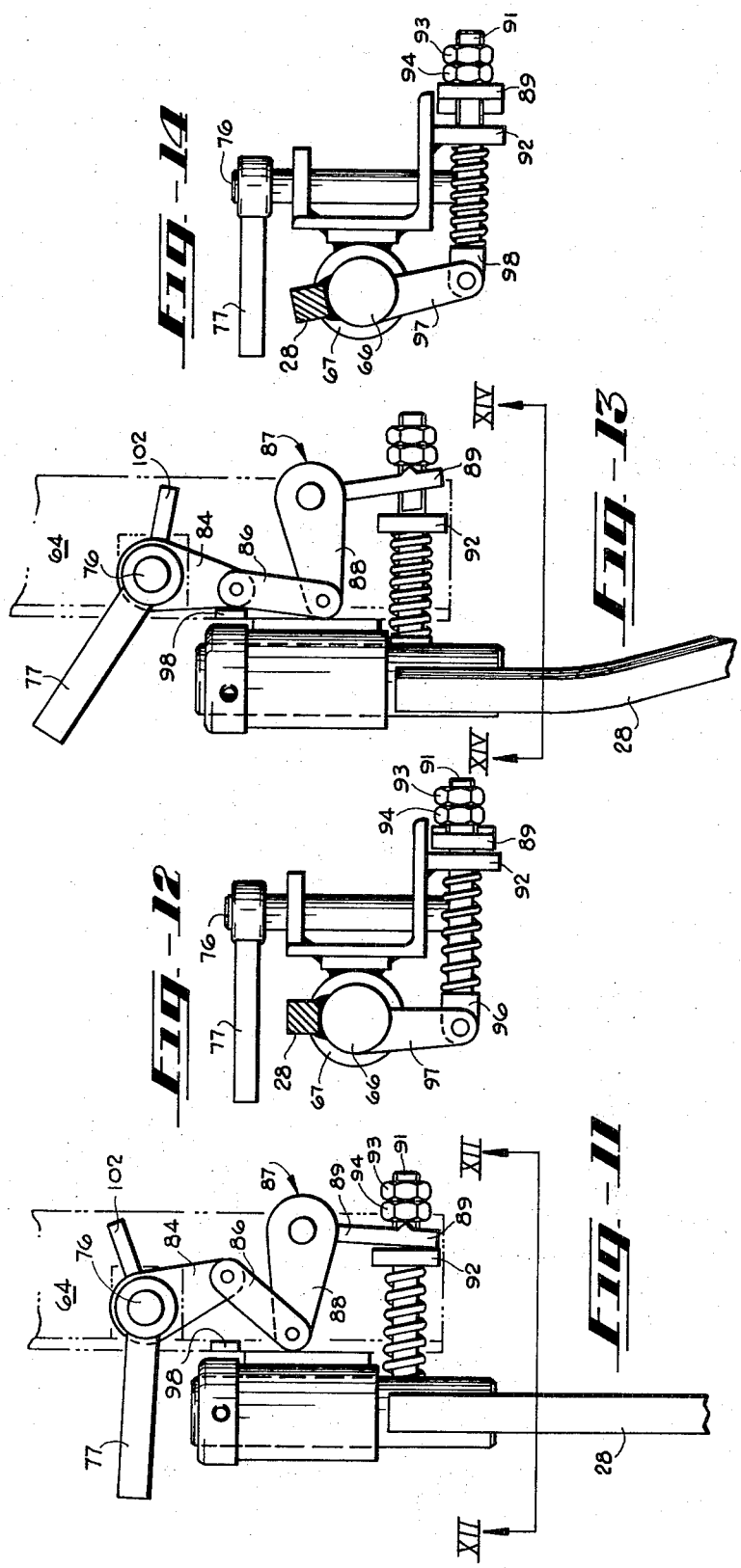

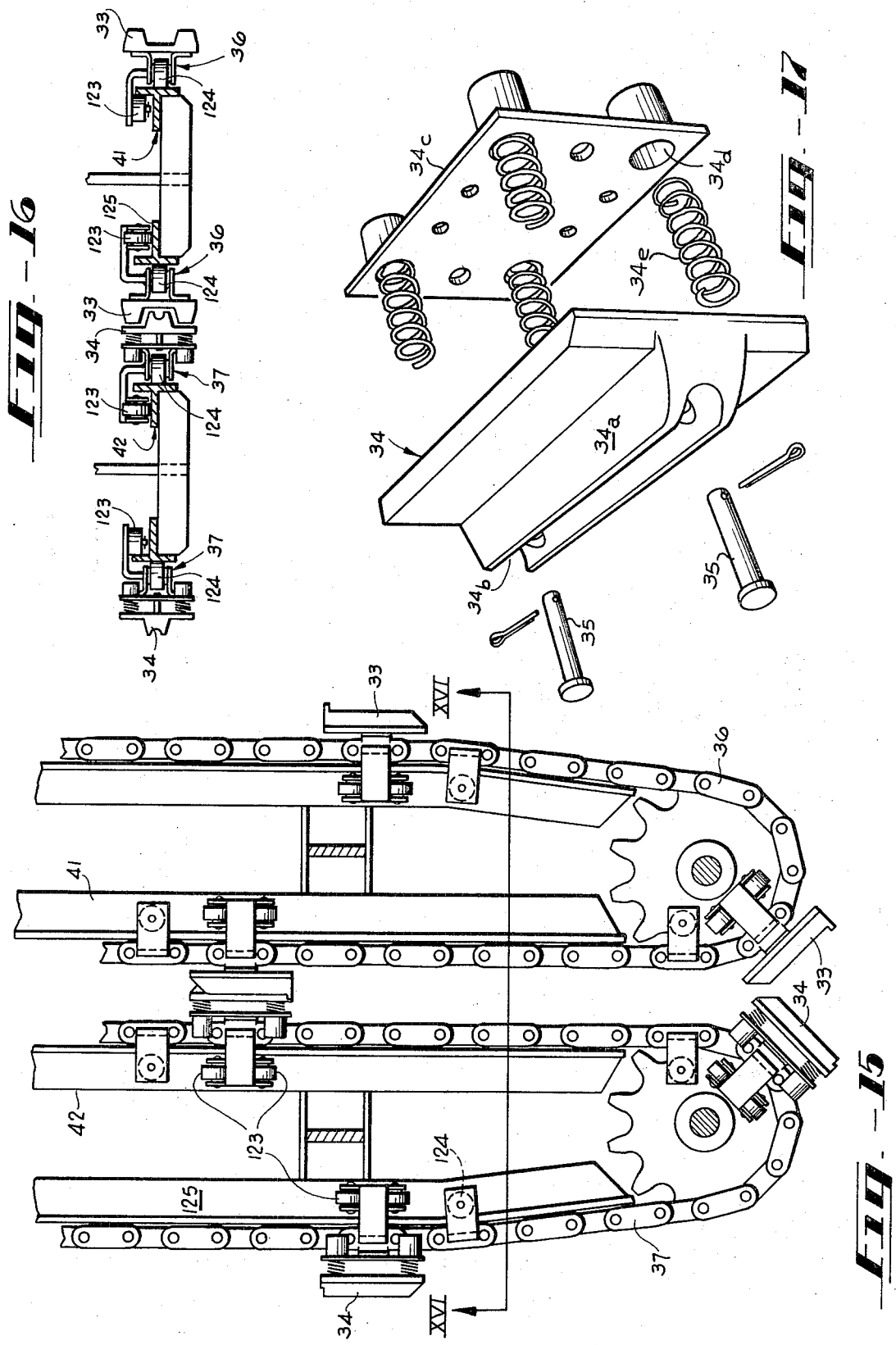

MECHANICAL VINE TRANSFER AND CARRIER

As is perhaps well known, upright hop picking machines are currently being used to strip the hops from hanging hop vines which are moved in succession through a hop picking zone of the machine wherein a multiplicity of hop picking fingers on confronting endless moving belts comb the hops from the vines while being moved on a vine carrier through the picking zone. A principal disadvantage of using such upright machines is the time consumed and expense incurred by reason of the necessity of having two operators at a vine storage station of the machine for lifting the vines off from hooks; bending the butt end of each hop vine: and inserting the bent ends into vine grasping jaws on a moving vine carrier. Frequently, an operator will drop a vine which results in a loss of hops as well as loss of time and expense of sweeping up the loose hops from the floor of the shed housing the picking machine; and frequently the operators will fail to place the bent butt end of the vine in between each and every successive vine gripper on the vine carrier so that a full load will not be transported by the carrier through the picking zone which, of course, lengthens the picking time for a given number of vines to be picked. The present invention is directed to the provision of means for obviating all of the foregoing disadvantages repeatedly encountered during the operation of such machines in each hop picking season.

A primary object of my present invention is to provide a mechanical vine transfer and carrier in a hop picking machine which automatically effects the removal of hanging vines from the magazine of a truck unloader and the transfer thereof into the jaws of vine grippers on the moving vine carrier which transports the hanging vines through the picking zone of the machine.

Another important object of the invention is to provide a mechanical vine transfer and carrier of the indicated nature which is additionally characterized by the incorporation of means for effectively synchronizing the movement of the elements of the transfer device with the movement of the vine carrier thereby eliminating the loss of hop vines and insuring the movement of a full load of hanging vines on each traverse of the carrier through the picking zone of the machine.

A still further object of the present invention is to provide a mechanical vine transfer and carrier of the aforementioned character which includes more effective vine gripping elements on my improved vine carrier to insure efficaceous transfer of hanging hop vines from at rest positions in a temporary storage station of the machine onto the vine carrier in a minimum of time and expense with an appreciable reduction in the loss of hops by dropping of the vines in a transfer operation.

Other object of the invention, together with some of the advantageous features thereof, will appear from the following description of the embodiment thereof illustrated in the accompanying drawings which exemplifies the best mode of constructing the invention and the manner of using the same. It is to be understood that the appended claims are intended to cover the embodiment illustrated as well as variations thereof within the scope of the invention.

Referring to the drawings:

FIG. 7 is a fragmentary top plan view of my improved vine transfer and vine carrier as viewed looking in the direction of the arrows marked VII—VII of FIG. 9.

FIG. 8 is a sectional elevational view of the main frame supporting the vine carrier components of my improved machine, this view being taken on the line VIII—VIII of FIG. 7.

FIG. 9 is a fragmentary side elevational view of the elements of the vine transfer component related to the two vine lifts and the vine carrier.

FIG. 10 is a longitudinal sectional view of a portion of the mechanism illustrated in FIG. 9 and taken on the line X—X thereof.

FIG. 11 is a fragmentary plan view of other elements shown in FIG. 9 and taken on the line XI—XI thereof.

FIG. 12 is a detail of the re-setting elements associated with the transfer hook of the vine transfer assembly.

FIG. 13 is a top plan view of certain positions of components of the vine transfer mechanism, this view being taken on the line XIII—XIII of FIG. 11.

FIG. 14 is a fragmentary view of the elements illustrated in FIG. 13 and taken on the line XIV—XIV thereof and showing positions of the components of the vine transfer assembly before completion of the outward stroke thereof.

FIG. 15 is a fragmentary top plan view of the horizontally disposed vine carrier components of my present improvements showing locations of opposed vine-gripping jaw components.

FIG. 16 is a view of the components illustrated in FIG. 15, this view being taken on the line XV—XV thereof. FIG. 17 is an enlarged perspective view of the spring-loaded vine-gripping jaw component which, together with an opposed fixed vine-gripping jaw component, make up a set of vine-gripping jaws for transporting hanging hop vines through a picking zone of the machine for stripping hops from the moving hanging hop vines.

The illustrated exemplification of my present invention in a mechanical vine transfer and vine carrier preferably comprises an upright frame, a pair of endless tracks for elevating hop vines to a predetermined level of said frame, a hop picking machine supported approximately at said level, vine gripping jaws in said machine, means for moving said machine to bring said vine gripping jaws together to grasp a hanging vine, a vine storage station supported on said frame at said level adjacent to said machine, an inclined section on each of said tracks for conveying hop vines by force of gravity to said storage station, a stop at said station to prevent movement of vines past the same, together with a mechanical vine transfer assembly at said station for lifting hanging vines from said sections and sequentially feeding the same to and between said jaws of said hop picking machine in timed relation to the movement of said machine.

Figure 1:
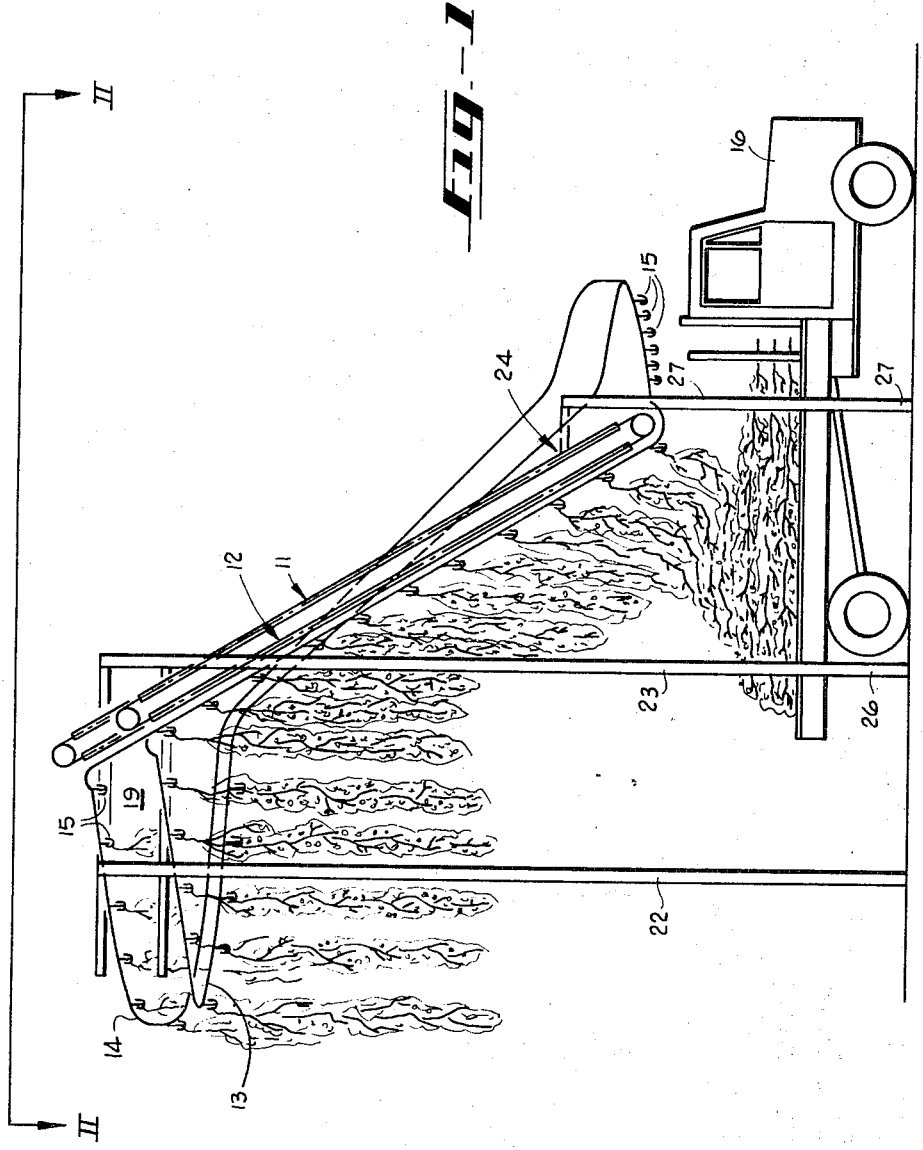
FIG. 1 is a side elevational view of two lifts for elevating hop vines delivered to the location by trucks and manually hung on holders constituting components of the inner and outer lifts shown.
Figure 2:
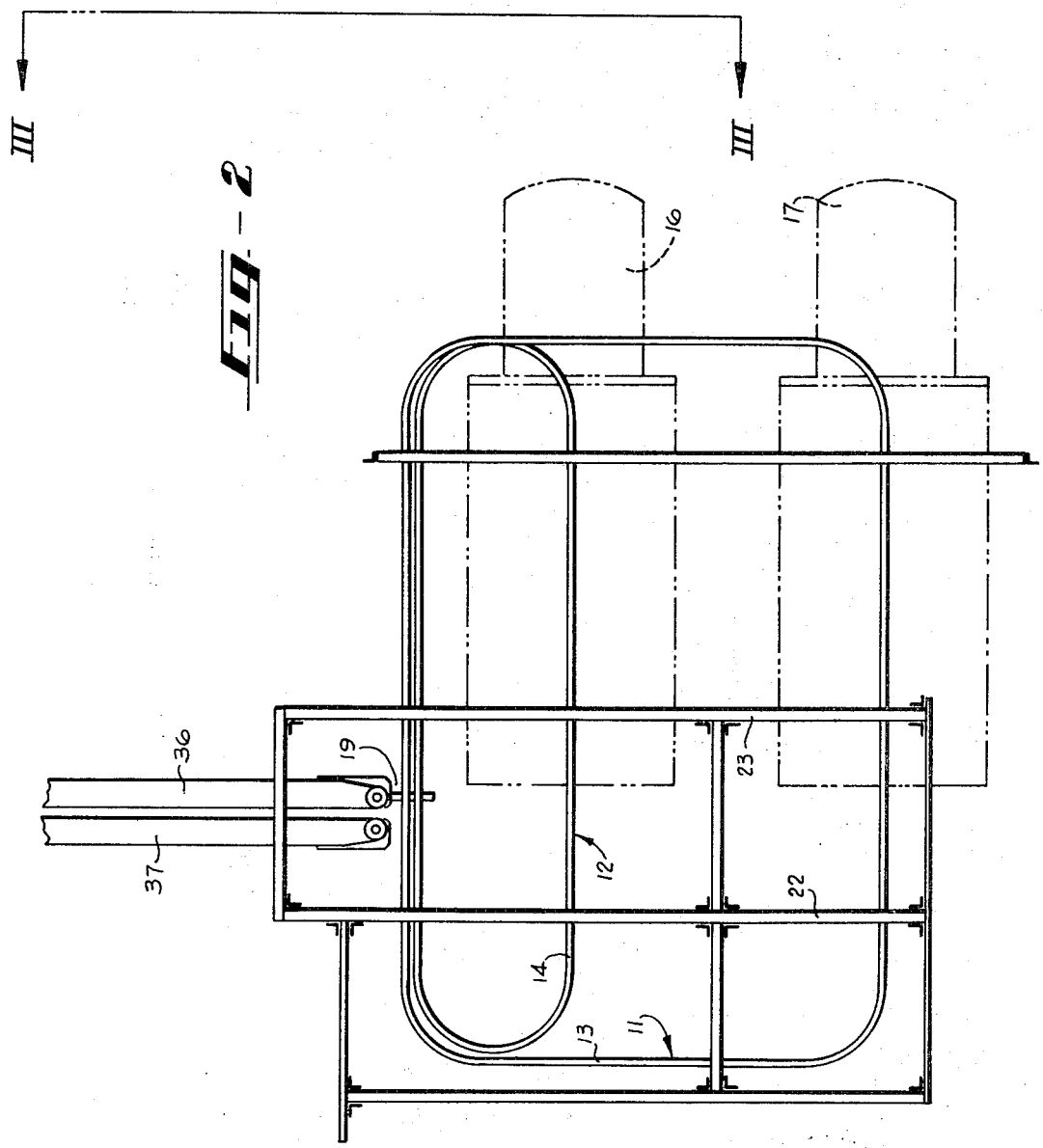
FIG. 2 is a top plan view of the two lifts illustrated in FIG. 1 and taken on the line II—II thereof, the delivery trucks beings shown in dotted lines and this view showing portions of the lifts leading to a temporary storage station of hanging vines.

The present invention utilizes the vine carrier portion of my prior invention described and claimed in my United States Letters Patent, No. 2,836,128, issued May 27, 1958 and entitled "Vine Carrier and Storage Apparatus for Hop Picking Machines" except that I provide an additional elevator, see FIGS. 1 and 2 of the annexed drawings, for receiving the hop vines taken from two trucks and feeding the same into the vine carriers of the elevators which carry the vines in hanging positions to a vine storage station. Moreover, my present invention incorporates the opposed or confronting driven endless belts carrying picking fingers of the hop picking unit of an upright or vertical hop picking machine disclosed in my United States Letters Patent, No. 3,474,895, issued Oct. 28, 1969. However, neither the aforesaid elevators with vine carriers nor the aforesaid opposed or confronting endless belts with hop picking fingers are, per se, a part of the present invention which does include, neverthe-less, a modified hop picking unit of an upright hop picking machine not made, sold or used prior to this invention hereinafter described, illustrated and claimed.

In accordance with my present invention, I provide a pair of elevators 11 and 12 each comprising an endless track 13 and 14, respectively for supporting individual vine carriers 15 to which the hop vines are attached upon removal from trucks 16 and 17, as indicated in FIG. 1 in full lines and in dotted line showing in FIG. 2 of the accompanying drawings. For purposes of brevity, the tracks 13 and 14 shall hereinafter be termed the inner and outer tracks, respectively, and the details of the vine carriers, designated generally by the reference numeral 15 are omitted since the form and construction of such vine carriers 15 are not per se, a part of the present invention. Suffice is it to say that there are provided a plurality of these vine carriers on each elevator 11 and 12 and that they are movably supported on rollers which ride on the tracks 13 and 14 holding the vines in hanging positions as the vines are elevated to positions adjacent a temporary storage station designated generally by the reference numeral 19, which is at approximately the same level as the endless chains of the modified hop picking unit, designated generally by the reference numeral 20 and constituting a part of my present invention. As shown, the elevators 11 and 12 are supported on suitable uprights 21 and 22 of a main frame 23, together with an inverted u-shaped auxiliary frame 24 having its standards 26 and 27 engaging the ground at the lower level of the elevators and under which the two trucks 16 and 17 are parked for unloading.

As particularly illustrated in FIG. 8 of the annexed drawings, I provide a movably mounted hook 28 operable at the temporary vine storage 19 in the general vicinity of a vine stop or abutment 28a which is bolted to a housing 29 of the vine transfer assembly, generally designated by the reference numeral 30, and which serves to stop the movement of the vine carriers 15 on both tracks 13 and 14 with their hanging hop vines in spaced relation to one another by virtue of the bulks of the vines. Such vine transfer assembly 30 is linked to and operated by the main drive assembly, see FIGS. 5 and 6, which is designated generally by the reference numeral 31, in synchronism with the movement of the hop picking unit 20 for conveying the hanging vines past the confronting picker belts hereinabove referred to and operating to comb the hops from the hanging vines.

In FIGS. 9 to 14 inclusive of the accompanying drawings, I have illustrated the various components and driving means of the vine transfer assembly 30 which serve to lift the hop vines from the elevator tracks 13 and 14 at station 19, and more particularly from the vine holders or carriers 15 thereon, by means of the hook 28 and which deliver or transfer them while still in hanging positions to the hop picking unit 20, see FIG. 15 showing the respective positions of one set of opposed jaw components 33 and 34 prior to receiving a hanging hop vine released by the transfer components to the closed jaw components 33 and 34 on the endless chains 36 and 37 of such picking unit. It is, of course, to be understood that the hook 28 is returned automatically during the operation of the vine transfer assembly to the area of the temporary vine storage station 19 where hook 28 lifts another vine from one or the other of tracks 13 and 14 of the elevators 11 and 12 and the cycle is repeated again and again with the hook 28 transferring the hanging vine to successive sets of opposed vine gripping jaw components 33 and 34 as they close at the feed end of the hop picking unit 20.

The mechanism of the vine transfer assembly 30 is synchronized with the movement of the components of the hop picking unit 20 so that each transferred vine will be properly transferred to and between successive opposed vine gripping jaw components of the picking unit in timed relation to the closing of each set of jaws, which empty or drop the picked vine at the discharge end of the picking unit 20 by the automatic opening of the jaws as they move around the sprockets in the continuing movements of the endless chains 36 and 37 on which the jaw components are carried.

Figure 4:
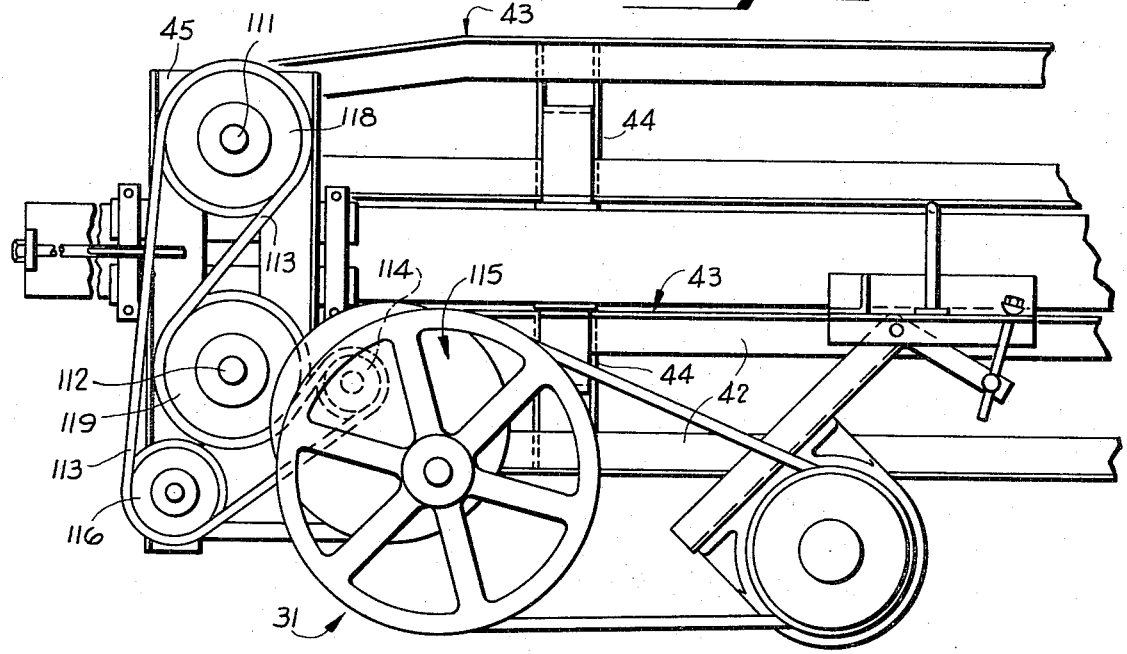
FIG. 4 is a top plan view of the main prime mover and drive assembly for operating the various synchronized components of my improved vine transfer and carrier.

Any suitable linkage and actuator means may be utilized for effecting the repetitive cyclic movement of the vine lifting hook 28 of the vine transfer assembly 30 and for synchronizing such repetitive cyclic movement with the movement of the endless chains 36 and 37 of the hop picking unit 20. In the embodiment illustrated, it will be observed that the chains 36 and 37 ride upon a pair of tracks 41 and 42 which are supported on a relatively long tube 43 of rectangular cross-section by means of arms 44 which are bolted to the tube and to the tracks 41 and 42; such tube 43 being supported on the main frame 45 of the machine. It also will be noted, by reference to FIGS. 4, 5 and 6 of the annexed drawings, that I utilize as a main drive for the movable components of the hop picking unit 20 a motor 40 which conveniently is located at the vine discharge end of the hop picking unit and which is placed in driving connection with the endless chains 36 and 37 by sprocket and chain connections including the sprocket 46 on the vertically supported rotatable shaft 47 of the picking unit 20. As further parts of the vine transfer assembly 30, I mount on the common shaft 47 above sprocket 46 an indexing disc 48 which is fashioned with an upstanding lug 49 thereon adjacent its periphery, see FIG. 9. Inasmuch as the movement of lug 49 on each revolution of shaft 47 is synchronized with the movements of the vine-gripping jaw components 33 and 34 on endless chains 36 and 37, the lug 49 is so located on indexing disc 48 as to engage each hanging vine 50, as it is being transported by hook 28, at the moment that lug 49 is centered over the vine-gripping jaw component 33 on endless chain 36, with the hanging vine retained in that relative position until the jaw components 33 and 34 come together, or are closed. It is to be appreciated that the engagement of lug 49 with each hanging vine 50 occurs as the vine is pulled over the edge of the indexing disc 48 by hook 28 as the hook nears the end of its return stroke; the hook delivering each hanging vine over the center line of disc 48, with the engaging lug 49 in coaction with a floating holder, hereinafter described, clamping each hanging vine to the indexing disc 48 until the jaw components 33 and 34 are closed.

In accordance with the present invention, I also mount on the common rotatable shaft 47, below sprocket 46, a cam 51 for rotation with the shaft; such cam 51 engaging upon each revolution of the shaft 47 a cam follower 52 movably mounted in a guide 53 and serving to push a rod 54 outwardly or away from the cam 51 on each revolution thereof. The outer end of rod 54 engages a roller 56 which is rotatably mounted within a spring loaded arm 57 pivotally mounted on a bearing support 58 extending from a strut 59 of the main frame 45 by means of a pivot pin 61. As clearly illustrated in FIGS. 9 and 10 of the annexed drawings, the arm 57 will be pivoted upon each revolution of the cam 51 on shaft 47 and moved to its farthest extent inwardly of the machine, as shown in dotted lines in FIG. 9, against the influence of the return spring 62 which is secured at its one end to a strut 63 of the main frame 45 and at its other end to the arm 57. When the cam 51 turns to its low spot and the cam follower continues to follow the cam, the spring 62 will allow the arm to return to its initial position as indicated by the full line showing thereof in FIG. 9, at which time the hook 28 returns to the outer limit of its stroke. During the inward movement of the pivotally mounted arm 57, a reciprocably mounted arm 64 that is pivotally connected to the upper end of arm 57 will be moved inwardly of the machine. It is to be noted here that the hook 28 is welded to a rotatably mounted stub shaft 66 which is journaled in a bearing 67 secured to the outer end of reciprocable arm 64 and the hook 28 accordingly will follow or be carried along with the movement of the arm 64.

In the embodiment of my improved machine illustrated in the accompanying drawings, I have provided means for moving the arm 64 upwardly and downwardly, as well as outwardly and inwardly of the mechanical transfer and carrier in order effectively to bring each hanging hop vine into an overlying position with respect to the vine-gripping jaws of the vine carrier. While any suitable mechanism can be employed for effecting this result, I conveniently provide and mount a stationary cam 68 on struts of the main frame 45; such cam 68 having a low point adjacent to its outer end which rises to a high point inwardly of the machine and which terminates in a downwardly inclined section adjacent to its high point. I also provide roller or cam follower 69, which is rotatably mounted on reciprocable arm 64 and arranged to ride upon the stationary cam 68. On the inward and upward stroke of the reciprocable arm 64, the cam follower 69 comes to rest on the downwardly inclined section of cam 68 at its high point, and also comes to rest on the outward and downward stroke of arm 64 at the lowest point of such cam under the control of the revolvable cam 51 on shaft 47. On each revolution of the cam 51, the arm 57 moves the reciprocable arm 64 inwardly and outwardly of the machine which, in turn moves the hook 28 upwardly to the limit of its inward stroke, as well as moves the hook 28 downwardly to the outer limit of its outward movement in response to each revolution of the sprocket 46 on rotatable shaft 47 of the hop picking unit. At the highest point of cam 68, the hook 28, which has been carried upwardly to the limit of its inward stroke by the inward movement of arm 64, is directly over the edge of the indexing disc 48. From such high point, the hook 28 moves downwardly upon the outward stroke of arm 64 to the lowest point of cam 68. Just before reaching the outer limit of the downward stroke, the hook 28 is moved into a straight line position behind a succeeding hop picking vine 50 by the mechanism hereafter described.

To secure each hanging hop vine 50 in the area between the hook 28 and jaw closure, I pivotally mount a floating holder 71 on frame 43 by means of a pivot 72; the holder floating between a raised position when engaged by the transferred hanging hop vine 50 and a lowered position on a stationary member 73 which is bolted inside of the open end of frame 43 as shown; it being noted that the web of stationary member 73 furnishes lateral support to the pivoting member on holder 71. The function of the floating holder 71 is to clamp each hanging hop vine to the upper surface of rotating indexing disc 48 on shaft 47 until jaw components 33 and 34 of the vine-gripping jaws close.

In order to avoid engagement between the vines resting against stop 28a and the descending hook 28 on its return stroke for the purpose of picking up and transporting each succeeding vine from station 19 to the picking unit, I provide means for twisting or turning the hook 28 on its down stroke and during its placement behind each succeeding vine. To this end, I provide a stub shaft 76 on the reciprocating arm 64 which is mounted for turning movement. I also provide on and adjacent to the top of shaft 76 a laterally extending lever 77 for engaging a spring-loaded gate 78, see FIG. 9 which is pivotally mounted on frame 43 in overlying relation to the feed end of the hop picking unit 20 as the lever 77 on shaft 76 is moved upwardly on cam 68. A stop 79 is fastened to frame 43 to limit the movement of the gate 78 in one direction, and a lug 81 is mounted in spaced relation to stop 79 for slidably holding a rod 82 which bears against the gate and normally holds it against stop 79 under the influence of a tension spring 83. As the lever 77 engages and passes the gate 78 on the upstroke of the hook 28, the rod 82 returns the gate 78 to its initial position against stop 79 under the action of spring 83. Upon the return movement of the lever 77 by the return of reciprocating arm 64, the lever will again engage gate 78 but since it is held against the stop 79 only the shaft 76 will be turned; such turning effecting the operation of an over-center lock-arm 84 which is welded to the shaft 76 and pivotally connected to one link 86 of a bell-crank 87 composed of the link 86 and a link 88 pivotally connected thereto, see FIGS. 11 to 14 inclusive which show the positions of the bell-crank 87 and its connecting links and actuator arm 89 on the down stroke of the hook 28. As illustrated, the arm 89 is welded to the link 88 of bell crank 87 and is apertured for the passing therethrough of a spring-loaded connecting rod 91 which is slidably mounted in a guide 92 welded to and depending from the reciprocating arm 64. The connecting rod 91 is threaded on its outer end for receiving an adjustment nut 93 as well as an inner lock-nut 94, and is pivotally connected at its inner end by means of a pivot link 96 to a link 97 which is welded to the stub shaft 66 that carries the hook 28.

When the shaft 76 is turned by the engagement of lever 77 with gate 78 at the start of the down stroke of the hook 28, the toggle or arm 84 will move from its position shown in FIG. II to an over-center position as shown in FIG. 13, causing the bell crank 87 to flatten-out against a stop 98 on the reciprocating arm 64. This latter position of the bell-crank 87 causes the actuating arm 89 on the bell-crank to bear against the lock nut 94 and push the connecting rod 91 outwardly as illustrated in FIG. 13 to, in turn, pull the link 97 on shaft 66 to the position shown in FIG. 14, thus turning the hook 28 away from the storage station 19. Just before reaching the outer limit of the return stroke of hook 28 by the action of revolving cam 51 on shaft 47, a trip arm 101 fastened to the underside of cam 68 engages a trip lug 102 on toggle or overcenter lock arm 84 to turn the shaft 76 back to an initial position, see FIG. 11, at which turning the actuator link 88 on bell-crank 87 will be moved back to its initial position out of engagement with lock-nut 94 on connecting rod 91 which is returned to its initial position by the action of a spring 103 confined between the bearing holding shaft 66 and a guide 92 on the rod 91, as illustrated in FIGS. 12 and 11 of the annexed drawings to place the hook 28 in straight line position. The hook 28 is thus back to the stored vines at storage station 19 and in back of a succeeding vine in readiness for picking up and transporting the succeeding vine in its next cyclic movement for transferring hanging vines to the jaws of the hop picking unit 20.

Figure 3:
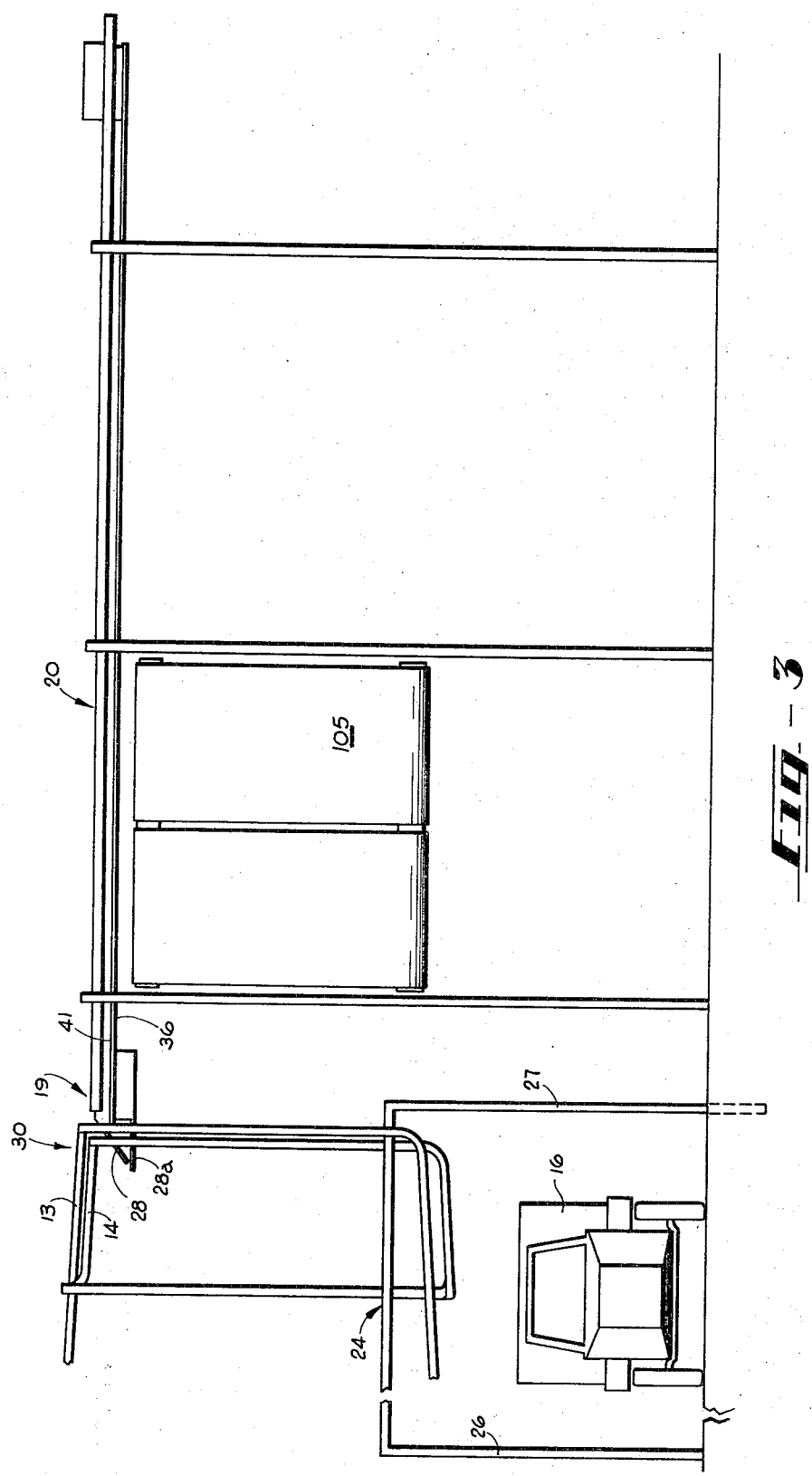
FIG. 3 is a sectional elevational view taken on the line III—III of FIG. 2, this view showing the related position of a vertical hop picking unit to the temporary vine storage station with one truck parked adjacent to the feeding end of the inner and outer vine lifts.

In accordance with my present invention, I have provided an improved hop picking unit 20 which comprises means for suspending in opposed relationship to one another and on the same horizontal lever, the endless chains 36 and 37 which move in a horizontal plane above the opposed vertically arranged picking belts of which but one is schematically illustrated in FIG. 3 of the accompanying drawings, designated by the reference numeral 105. No change has been made in the confronting picking belts per se and such belts per se are not my improved invention but constitute only a component thereof. Each of the confronting picking belts 105 employed and embodied in my improved machine is similar to the picking belts disclosed in my prior United States Letters Patent, No. 2,677,378, see FIG. 2 thereof, and are movably mounted as described and illustrated therein, see FIG. 10 thereof. The aforesaid means include the horizontally extending frame 43 which holds the endless horizontally disposed tracks 41 and 42 by means of the arms 44 which are arranged in spaced relationship to one another in opposed parallel relationship and which are bolted to opposite sides of the frame; the latter being fastened in any suitable manner to the main frame 45 of the machine.

Figure 6:
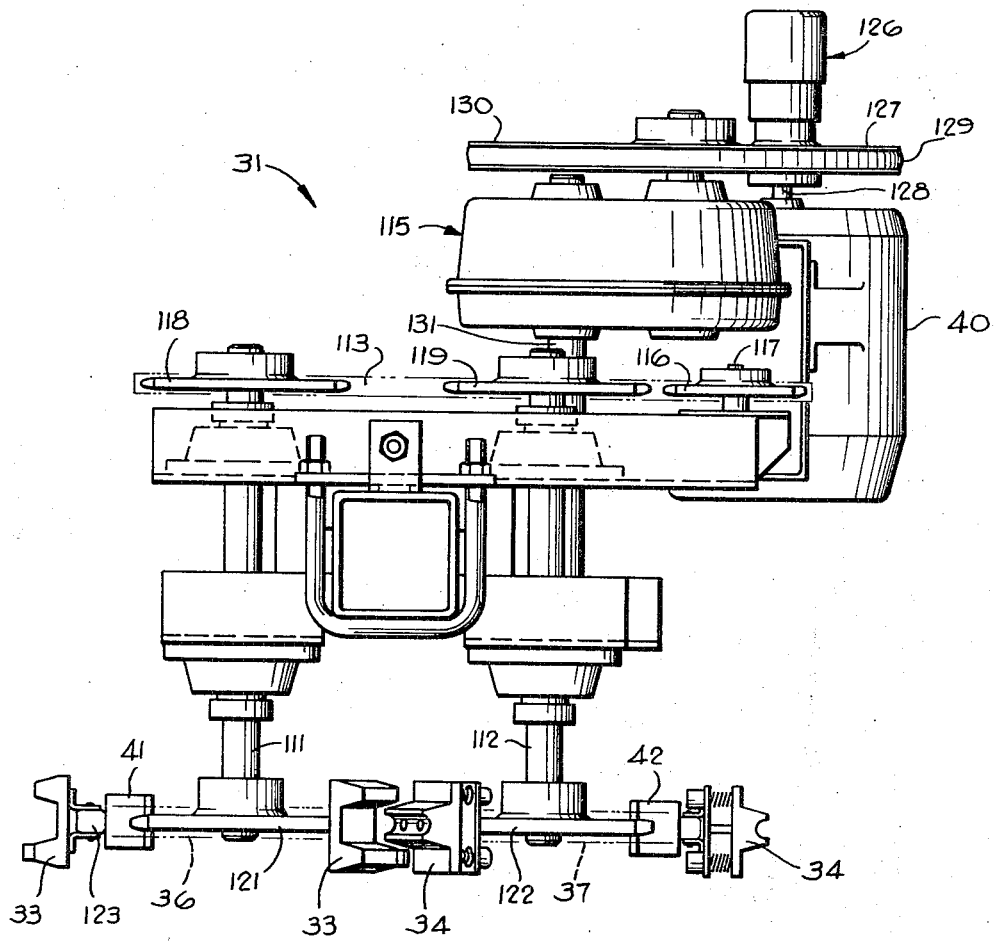
FIG. 6 is an end elevational view of the discharge end of the vine carrier and drive connections therefor.

The endless chains 36 and 37 are mounted for rotation on the rails 41 and 42, respectively, and are separately driven in opposite directions of rotation by the principal or main motor 40 supported on main frame 45 and placed in driving connection with driven shafts 111 and 112, see FIG. 6. These two shafts are journaled in suitable bearings for rotation about a vertical axis, by means of a chain 113 which is trained about a sprocket 114 on the shaft of a speed reducer 115 which is connected to motor 40 by belt and pulley drive, as well as trained about a sprocket 116 secured to an idler stub shaft 117 which is journaled in a bearing secured to the main frame 45 and which rotates about a vertical axis parallel to the driven shafts 111 and 112. The endless chain 113 also is trained about upper sprocket 118 on shaft 111 as well as upper sprocket 119 on sprocket 112 but so trained about the latter sprocket as to rotate the sprocket and shaft 119 and 112, respectively, in an opposite direction of rotation than the rotation of the shaft 111 and sprocket 118. Lower sprockets 121 and 122 are secured to the driven shafts 111 and 112, respectively, and the endless chains 36 and 37 are trained about such sprockets 121 and 122 at one or the discharge end of the hop picker unit 20 while these endless chains 36 and 37 are also trained about the sprockets 46 and 46', respectively, on shafts 47 and 47' at the other or feed end of the hop picking unit 20.

In accordance with my present invention, the endless chains 36 and 37 are movably held to the tracks 41 and 42 respectively, by means of suitable rollers in a manner herein-after more specifically described, and each of the chains 36 and 37 carry at uniformly spaced apart points thereof vine-gripping jaw components riveted to links of the chains; each of which consists of a stationary jaw component 33 fixedly secured to the chain 36 and a yieldable jaw component 34 which is yieldably mounted on the endless chain 37. As particularly illustrated in FIGS. 15 and 16 of the drawings, I provide a series of vertical support rollers 123 and horizontal support rollers 124 for movably holding the endless chains 36 and 37 to the tracks 41 and 42; each vertical support roller 123 being attached to the link of the chain to which the vine-gripping jaw component is riveted and each horizontal support roller 124 is attached to the second chain link of the chain ahead of each vine gripping jaw component. Thus, the horizontal rollers 124 hold the chains in position while transversing the outside reaches of the tracks 41 and 42 while the vertical support rollers are riding on the flat horizontally disposed portion 125 of each of the tracks.

Upon starting motor 40, which can be connected by any suitable cord and plug, not shown, to a source of electrical energy through an outlet, also not shown, the endless chains 36 and 37 are rotated in opposite directions of rotation and bring, respectively, the stationary jaw component 33 of each of the set of vine-gripping jaws and the yieldably mounted jaw component 34 of each set to a closed position at the feed end of the hop picking unit 20. In the embodiment of my improved machine illustrated in the accompanying drawings, the components of each vine-gripping set of jaws on each endless chain 36 and 37 are spaced 18 inches apart uniformly about such endless chains with the fixed jaw component 33 of each set aligned in opposed relationship to the yieldable jaw component 34 of each set, and the movement of the chains 36 and 37 are so synchronized and the chains so arranged on tracks 41 and 42 that each of the jaw components 33 and 34 of each set will approach each other as the chains make the turn about sprockets 46 and 46' at the input or feed end of the hop picking unit 20 and will meet or close about each hanging vine 50 as it is held by the holder 71 against the revolving index disc 48. This repetitive synchronization or time relation movement of the chains and carried components of each set of vine-gripping jaws with the transfer of the hanging vines into the closing jaw components 33 and 34 is attained by so constructing the cam 51 that upon each revolution of the shaft 47 the hanging vine will be carried the distance between the temporary storage 19 and a point overlying the feed end of the hop picking unit 20. Also, by means of the index disc 48, mounted on the common shaft 47, which carries the lug 49 for engaging, along with the floating holder 71, each successive hanging vine 50 as it is clamped against disc 48 over which it is drawn by the hook 28. Thus, upon each 18 inch movement of the chains 36 and 37 the vine-gripping jaws on the chains will, at the feed end of the hop picking upit 20 be in a position coinciding with the position of the lug 49 on index disc 48.

It is to be noted that the vine-gripping jaw components 33 and 34 remain in closed position clamping the hanging vines there-between during the entire length of the straight inner reaches of the chains 36 and 37 past the opposed hop picking belts 105. As the chains 36 and 37 approach the vine-discharge end of the picking unit 20 and move about the sprockets 121 and 122 on driven shafts 111 and 112, respectively, see FIG. 6, the components 33 and 34 of each set of vine-gripping jaws are opened or moved apart and the picked vines will drop by force of gravity onto a take-off conveyor, not shown, movably mounted below the discharge end of the hop picking unit.

While any suitable vine-gripping means may be employed for receiving, retaining and releasing the hanging hop vines mechanically transferred from the temporary storage station 19 to the feed end of the hop picking unity 20, transporting the hanging vines, and dropping them after having been picked, I preferably use in my improved machine the type of jaw components 33 and 34 of each set of vine-gripping jaws which are illustrated in FIGS. 15–17 inclusive of the annexed drawings. As shown, the component 33, or fixed stationary jaw, is so constructed as to provide a recessed plate 33a which can be cast from aluminum or other light-weight metal such as an alloy of aluminum and nickel and which is fashioned with an integral extension 33b as well as with a plurality of rivet holes for receiving rivets for fastening each plate 33a rigidly to a link of its associated endless chain 36.

Each spring-loaded component 34 of each of the sets of vine-gripping jaws preferably comprises a cast aluminum or aluminum alloy plate 34a formed with a recessed portion 34b which is co-extensive in width with the width of plate 34a and arranged at the center thereof to define a center grip matching the grip of the jaw component 33 on opposite chain 36. In addition the jaw component 34 includes a rectangular steel plate 34c with integral sockets 34d thereon in which springs 34e are received. Any number of sockets and associated springs may be utilized, although in the embodiment illustrated the steel plate 34c is fashioned with four sockets adjacent to the four corners for receiving and seating four springs 34e. The two plates 34a and 34c are joined together by keeper pins 35 which pierce the plates between the springs 34e. This construction of jaw component 34 affords a yielding of the plate 34a whenever a bulky hanging vine is disposed between the about to close jaw components at the feed end of the hop picker 20. The springs 34e nevertheless are stiff and strong enough to maintain the plate 34a in gripping engagement, in conjunction with the jaw component 35, with each hanging vine despite its bulk. It may be noted, also, that the recess or relief in jaw component 34 is provided to clear the extension 33b on jaw component 33 as the two jaw components of each set meet in opposed relationship on the opposed endless chains 37 and 36.

It is clear that the arrangement of the endless chains 36 and 37 in common horizontal plane and the drive thereof in opposite directions of rotation not only provides for successive automatic closing of opposed jaw components 33 and 34 of the series of vine-gripping jaws arranged at 18 inch intervals along each of the chains, thus gripping hanging vines held by transfer components 49 and holder 71 as index disc 48 rotates, and transporting them through the picking zone defined by the pair of confronting picker belts 105, but also provides for successively opening the vine gripping jaws at the discharge end of the hop picking 20 as each chain 36 and 37 moves around the sprockets on shafts 111 and 112 to carry the jaw components 33 and 34 away from one another. This feature reduces to a minimum the liklihood of dropping full vines and speeds up the handling of the vines as well as picking operations with the machine operating at full load at all times at almost twice the picking capacity of all prior machines; the mechanical vine transfer substituting for human muscle power and human error.

Figure 5:
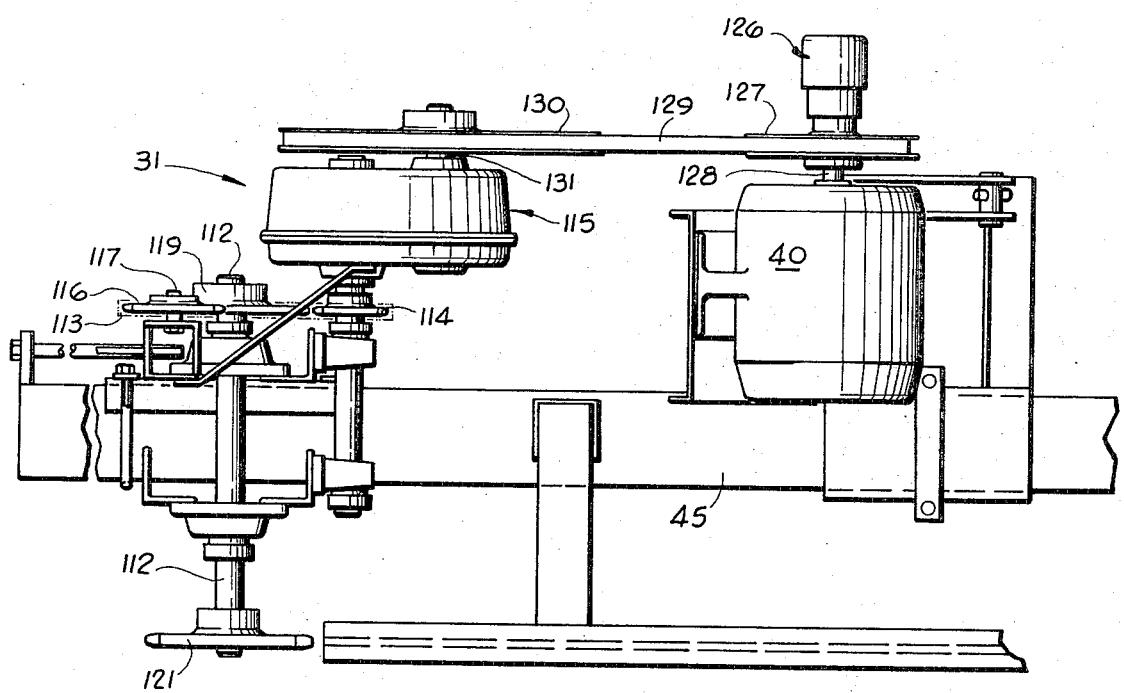
FIG. 5 is a side elevational view of the drive components illustrated in FIG. 4.

While any suitable drive connections between the motor 40 and speed reducer 115 can be employed for controlling the speed of movement of the endless chains 36 and 37, I utilize a variable pitch pulley, see FIGs. 5 and 6, designated generally by the reference numeral 126, which includes a relatively large pulley 127 fixedly secured to the shaft 128 of motor 40 and over which a belt 129 is trained for causing the rotation of the larger pulley 130 fixedly secured to the shaft 131 of the speed reducer and over which the belt 129 also is trained. This speed reduces 115 and associated drive mechanism is not per se a part of my present invention, and may or may not be incorporated therein as desired.

I claim:

1. A mechanical vine transfer and vine carrier comprising a frame, at least one vine storage track on said frame for temporarily storing hanging hop vines, a vine carrier movably mounted on said frame, vine-gripping jaws on said carrier for transporting hanging hop vines, mechanically operable vine transfer means movably mounted on said frame for automatically transferring hanging hop vines from at rest positions on said track into said vine-gripping jaws on said vine carrier for transporting the hop vines for picking hops therefrom, and power means in driving connection with said vine carrier and said mechanically operable vine transfer means for moving the same in timed relationship to one another.

2. A mechanical vine transfer and vine carrier as set forth in claim 1 wherein said vine carrier is movably mounted in a predetermined plane, at least one pair of confronting endless hop picking belts movably mounted on said frame below said predetermined plane, hop picking fingers on each of said pair of endless confronting belts projecting into the path of carrier transported hanging vines, and drive means connecting each of said pair of endless belts to said power means.

3. A mechanical vine transfer and vine carrier as set forth in claim 1 wherein said vine carrier comprises a pair of endless chains, means for connecting said endless chains to said power means to effect movement of said chains in opposite directions of rotation.

4. A mechanical vine transfer and vine carrier as set forth in claim 3, and a series of a first component of said vine-gripping jaws fixedly secured to one of said pair of movable endless chains, and a series of a second component of said vine-gripping jaws yieldably mounted on the other endless chains of said pair of endless chains; said first component and said second component of each of the series thereof being aligned and confronting each other on the inner reaches of said endless chains during movement thereof in opposite directions of rotation to define sets of a series of vine-gripping jaws in which hanging hop vines are transported past said pair of confronting endless belts to be combed and hops removed therefrom by said picking fingers.

5. A mechanical vine transfer and vine carrier as set forth in claim 4 wherein said vine-gripping jaws come together at a feed end of said pair of movable vine carrier to receive and grip a succession of hanging hop vines from said mechanical vine transfer means, and move apart at a discharge end of said vine carrier to permit dropping of picked hanging hop vines by force of gravity from said pair of endless chains.

6. A mechanical vine transfer and vine carrier as set forth in claim 1 wherein said vine transfer means comprises a hook for lifting a hanging hop vine from said track and transporting the same to said vine carrier in response to the movement of said vine carrier.

7. In combination with an elevator containing at least one track and a series of holders on said track for lifting hanging hop vines to an at rest position at a temporary storage station, a vine carrier, a series of vine-gripping jaws arranged in spaced relation to one another on said vine carrier, and mechanically operable means for automatically lifting in repetitive cyclic movements a succession of hanging hop vines from said holders at said temporary storage station and transferring them to a succession of vine-gripping jaws on said vine carrier, and means for moving said vine carrier and said mechanically operable means in timed relation to one another.

8. The combination set forth in claim 7 wherein said mechanically operable means comprises a swingable hook, and cyclic repetitive means for swinging said hook.

9. The combination set forth in claim 8 wherein said hook moves in a predetermined path on each repetitive up-strokes thereof in transferring each hanging hop vines to said vine carrier for picking, and means for moving said hook in a path different from said predetermined path on its repetitive down-strokes to bring said hook to a position behind a hanging vine at said storage station for transfer on the succeeding up-stroke of said hook.

10. The combination of claim 8 wherein said means for moving said hook in repetitive cycles comprises a driven shaft, a revolvable cam on said shaft, a shiftable rod extended and retracted on each revolution of said cam, a spring-loaded arm responsive to the extension of said rod, a reciprocable arm pivotally connected to said spring-loaded arm, a stationary cam having a high point and a low point, a roller journaled on said reciprocable arm and riding on said stationary cam, a bearing secured to the inner end of said reciprocable arm, and a rotatable shaft journaled in said bearing and carrying said hook; said hook being raised and lowered upon each revolution of said driven shaft through the action of said revolvable cam in transmitting movement to said spring loaded arm and the reciprocation of said reciprocable arm as well as the raising and lowereing the same on said stationary cam.

11. The combination set forth in claim 9 wherein said driven shaft is common to said mechanically operable vine transfer means and said vine carrier and wherein said vine-gripping means on said carrier move a predetermined distance upon each revolution of said revolvable cam on said driven shaft.

12. The combination set forth in claim 9, and an index disc on said driven shaft, a lug on said index disc for engaging each hanging vine during its movement between said temporary storage station and said vine carrier, and a floating holder in opposed relation to said lug on said index disc for engaging and holding said hanging vine against said index disc during its transfer by said hook between said storage station and said vine carrier.

13. The combination set forth in claim 9, and a spring-loaded gate pivotally mounted on said frame above said stationary cam, a stub shaft mounted for rotation on said reciprocable arm, a gate-opening arm on said shaft for opening and passing said gate on each inward and upward movement of said reciprocable arm during revolution of said revolvable cam, a stop mounted adjacent said gate for limiting the return movement of said gate when engaged by said gate-opening arm on the outward movement of said reciprocable arm thereby effecting a turning of said stub shaft, a bell-crank actuated by the turning of said stub shaft, a lever on said bell-crank, a spring-loaded connecting rod pivotally connected to said hook-carrying shaft; movement of said lever on said bell-crank effecting a turning of said hook-carrying shaft on each down-stroke of said hook on each repetitive cyclic movement therof to move said hook out of said predetermined path, a trip lug on said stub shaft, and means on said reciprocable arm engageable with said trip lug on the outward stroke of said reciprocable arm to return said stub shaft and said lever on said bell-crank to initial positions and to move said hook into starting position for lifting a successive hanging hop vine at said temporary storage station off its corresponding holder on the succeeding up stroke of said hook.

14. The combination set forth in claim 12 wherein the closing of said vine-gripping jaw components on said vine carrier is effected during the movement of said index disc with said lug and said holder pressing the hanging hop vine against said index disc as said hook nears the completion of its return stroke on each repetitive cyclic movement thereof.

* * * * *